(No Model.)　　　　　　　　　　　　　　　　2 Sheets—Sheet 1.
E. McCREARY.
MACHINE FOR CUTTING KNIT FABRICS.

No. 548,784.　　　　　　　　Patented Oct. 29, 1895.

WITNESSES
William A. Swett
Charles S. Brinthall

INVENTOR
Edward McCreary
by W. E. Hagan atty

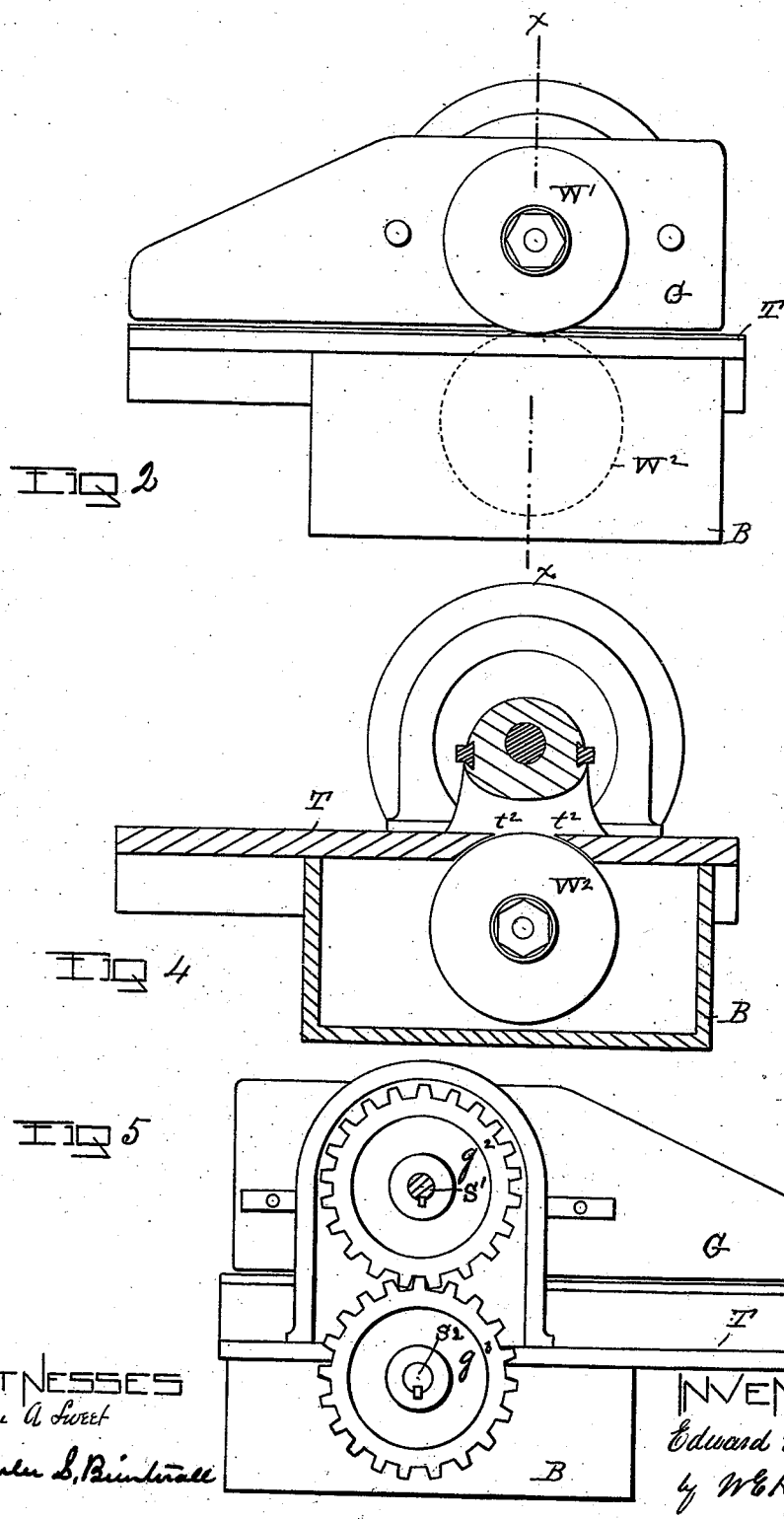

UNITED STATES PATENT OFFICE.

EDWARD McCREARY, OF COHOES, NEW YORK.

MACHINE FOR CUTTING KNIT FABRICS.

SPECIFICATION forming part of Letters Patent No. 548,784, dated October 29, 1895.

Application filed November 12, 1894. Serial No. 528,495. (No model.)

*To all whom it may concern:*

Be it known that I, EDWARD MCCREARY, of the city of Cohoes, county of Albany, and State of New York, have invented a new and useful Improvement in Rib-Line Trimmers for Knit Goods, of which the following is a specification.

My invention relates to improvements upon that class of apparatus which is used to cut or shear knit goods on a selvaged or ribbed line which has been knit into the material, and in which machines rotary cutters are used; and the object and purpose of my invention are to better adapt this class of devices to the uses for which they are designed by the construction and arrangement of an improved guide-plate, the construction of the machine-table, and to reduce the number of working parts, as well as to simplify their construction. In older machines of this class rotary cutters have been combined with presser wheels or rollers for moving the fabric, which were caused to bear upon the latter by presser-rollers actuated by springs. By an improved form given to the shearing-rollers, their arrangement with reference to the table on which the goods are cut, and the combination with the table and rollers of a guide-plate made laterally adjustable to the table and machine I am enabled to dispense with rollers acting independently of those doing the cutting.

Accompanying this specification to form a part of it there are two plates of drawings containing five figures illustrating my invention, with the same designation of parts by letter-reference used in all of them.

Figure 3:
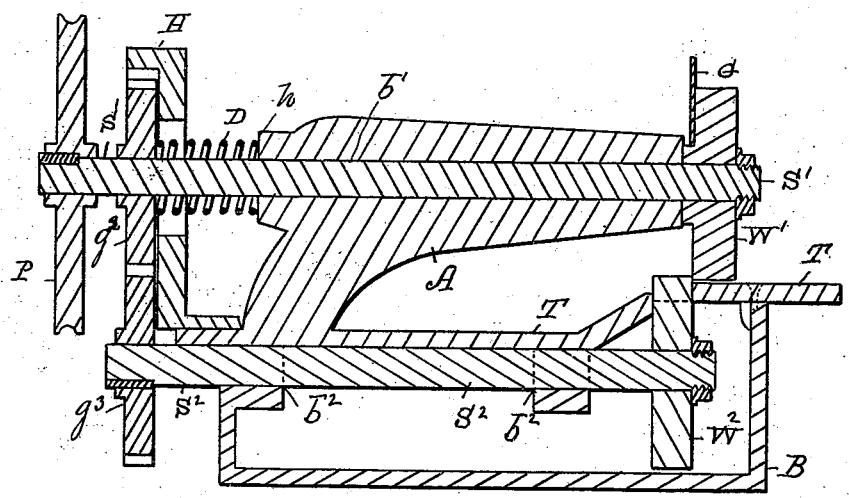
Figure 4:
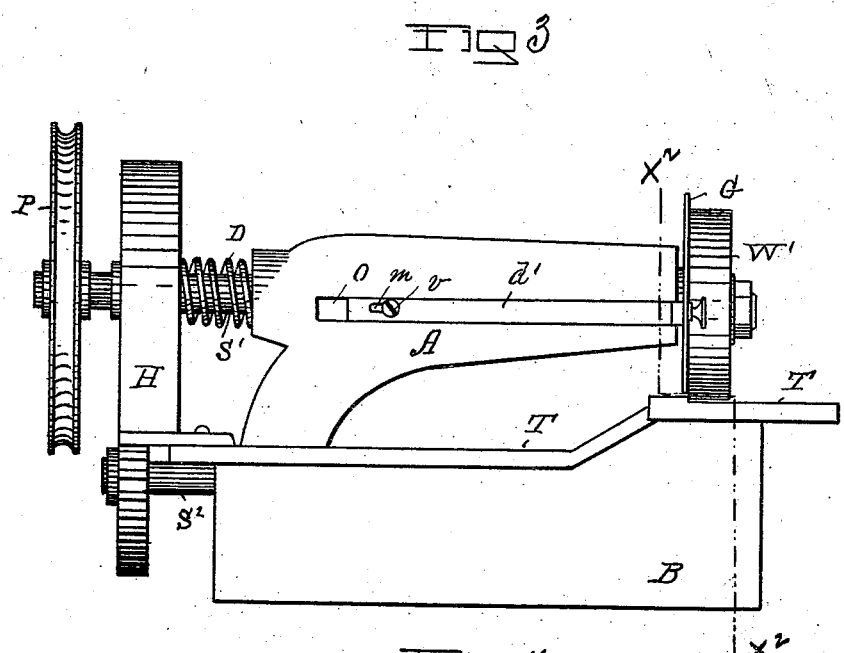

Of the illustrations, Figure 1 is a side elevation of a machine containing my invention. Fig. 2 is an end elevation on the line $x^2 x^2$ with that end whereat the cutting is done shown as facing the view. Fig. 3 is a section taken on the line $xx$ of Fig. 2. Fig. 4 is an end view with the guide-plate and outer cutting-wheel removed, its shaft shown in cross-section, with the view taken at the cutting end of the machine taken on the line $x^2 x^2$ of Fig. 1. Fig. 5 is another end view of the machine, with that end of the machine at which power is applied facing the view, the driving-pulley being removed and its shaft shown in cross-section.

The several parts of the apparatus thus illustrated are designated by letter-reference, and the function of the parts is described as follows:

The letter B designates the base on which the working parts are supported; A, an arm that is upwardly and laterally projected from the base.

The letter T designates a table on which the knit material is placed when being cut, and the letter G a guide-plate that is upwardly projected from the table, along which guide-plate the material is moved, with the rib knit into the material bearing against the inside of the guide-plate.

The letters W' and W² designate the rotating cutters, having the form of wheels, with their perimeters at right angles to their sides, and which are mounted upon separate shafts, one above at one side of the other, and so that the cylindrical face of the upper wheel will engage with the material to be cut to move it along, while the inside edge of the upper cutter W' will lap past so as to form a shearing engagement with the lower rotary cutter W² upon its outside edge where lapping past the edge of the upper wheel W'.

The upper rotating cutter W' is arranged on so as to turn with the shaft S', having its journal-bearings at $b'$ in the arm A, and the lower rotating cutter W² is arranged on so as to turn with the shaft S², made to journal in the base B at $b^2$.

The letter H designates a housing, and the letter $g^2$ designates a gear-wheel secured to the outer end of the shaft S', and the letter $g^3$ designates a gear-wheel arranged on the outer end of the shaft S² and constructed to mesh into the gear-wheel $g^2$, the latter being arranged within the housing H and immediately over the gear-wheel $g^3$.

The letter P designates a driving-pulley arranged on the shaft S', outside of the gear-wheel $g^2$, by which power is communicated to the machine. As thus constructed and connected, when power is applied the two rotating cutters are actuated to turn with their side edges in a shearing and cutting contact.

The letter D designates a spiral spring inclosing the shaft S', between the shoulder $h$ of the arm A and the wheel $g^2$, and the function of this spring is to keep the cutting-edge of the rotating cutter W' in an elastic contact with the side edge of the rotating cutter $W^2$ where lapping past the latter.

The table T is cut away in an arc form at $t^2$ for the upward passage of the cutting-roller $W^2$, as shown at Fig. 4, so as to bring the perimeter of the latter at its upper edge, where within the opening $t^2$, in line with the top of the table T. The guide-plate G is attached to the outer end of the horizontal bar $d'$, and the letter O designates a horizontal slideway formed in the side of the arm A, in which slideway this bar $d'$ can be moved back and forth laterally, with its measure of horizontal movement limited to the length of the slot $m$, formed in the bar $d'$, and the set-screw $v$ passing through said slot to connect with the arm A and with its head where projecting beyond the slot straddling the latter, so as to rest on the sides of the bar $d'$ where straddling the said slot. As thus made and arranged to operate, when a piece of material having a rib knit therein is placed upon the table with the rib bearing against the guide-plate G and caused to come under the action of cutting-rollers it is moved along or cut by the latter in line close to the rib with a clear clean cut edge, without having a notched appearance, as will occur, owing to its elastic condition, when not held firmly during the operation of cutting.

Having thus described my invention, what I claim, and desire to secure by Letters Patent, is—

The combination with the rotating cutters $W'$, $W^2$, having a wheel-form and each made with a perimetral face which is at right angles to its sides and arranged one above the other to be operated by gear wheels with their adjacent side edges at their perimeters making a shear engagement with each other; of an arm upwardly projected from the machine base, said arm having a shoulder $h$, and slideway O, and having a spiral spring encircling the shaft of the upper gear wheel between the latter and the arm shoulder; the table T, having the opening $t^2$; the vertical guide-plate G, upwardly projected from said table; and the bar $d'$, connected to said guide-plate and adapted to be adjustably secured in said arm slide-way, substantially as and for the purposes set forth.

Signed at Troy, New York, this 19th day of December, 1893, and in the presence of the two witnesses whose names are hereto written.

EDWARD McCREARY.

Witnesses:
W. E. HAGAN,
CHARLES S. BRINTNALL.